(12) United States Patent
Trajkovski et al.

(10) Patent No.: US 9,167,393 B2
(45) Date of Patent: Oct. 20, 2015

(54) CABLE CHIP SYSTEM

(71) Applicant: Nextlink IPR AB, Malmö (SE)

(72) Inventors: Ljupco Trajkovski, Bagsværd (DK); Steen Iversen, Roskilde (DK); Jan Larsen, Smørum (DK)

(73) Assignee: Nextlink IPR AB, Malmö (SE)

( * ) Notice: Subject to any disclaimer, the term of this patent is extended or adjusted under 35 U.S.C. 154(b) by 0 days.

(21) Appl. No.: 14/397,898

(22) PCT Filed: May 1, 2013

(86) PCT No.: PCT/EP2013/059072
§ 371 (c)(1),
(2) Date: Oct. 30, 2014

(87) PCT Pub. No.: WO2013/164374
PCT Pub. Date: Nov. 7, 2013

(65) Prior Publication Data
US 2015/0133100 A1    May 14, 2015

(30) Foreign Application Priority Data
May 2, 2012   (DK) ................................ 2012 70224

(51) Int. Cl.
*H04M 1/00*        (2006.01)
*H04W 4/10*        (2009.01)
(Continued)

(52) U.S. Cl.
CPC ............. *H04W 4/10* (2013.01); *G06F 13/4027* (2013.01); *G06F 13/426* (2013.01); *H04M 1/72525* (2013.01); *H04M 1/72527* (2013.01)

(58) Field of Classification Search
USPC .................. 455/418, 559, 73, 557, 569.1, 66, 455/426.1, 41.2, 462, 550.1, 575.2, 348, 455/350; 710/73, 3, 6, 11, 99, 105, 315, 710/107, 38
See application file for complete search history.

(56) References Cited

U.S. PATENT DOCUMENTS 5,913,163 A * 6/1999 Johansson .................. 455/426.1
7,426,585 B1    9/2008 Rourke
(Continued)

FOREIGN PATENT DOCUMENTS

EP            2230605 A1    9/2010
WO       94/11802 A1    5/1994
(Continued)

OTHER PUBLICATIONS

International Search Report corresponding to co-pending International Patent Application Serial No. PCT/EP2013/059072, European Patent Office, dated Nov. 29, 2013; (5 pages).
(Continued)

*Primary Examiner* — Ganiyu A Hanidu
(74) *Attorney, Agent, or Firm* — Nixon Peabody LLP

(57) ABSTRACT

The present invention relates to communications systems incorporating peripheral devices such as a push-to-talk (PTT) or similar and interface cables to connect these to a headset and/or a communication device such as a man worn two-way radio, vehicle intercom system, mobile phone, etc. In particular, the invention relates to such interface cable having an integrated functionality. The basic idea of the invention is to use an interface between a first and a second device in a voice communication system, which interface is specific to the second device and holds digital information allowing the first device to identify or adapt to the second device. This allows the first device to automatically adapt its settings and/or functionality to, and thus to function with, several different second devices without any need for updating, re-configuration, or user intervention. Thus the first device can be hot swapped or hot plugged with different second devices simply by using a cable specific to each particular second device.

18 Claims, 3 Drawing Sheets

(51) Int. Cl.
*G06F 13/40* (2006.01)
*G06F 13/42* (2006.01)
*H04M 1/725* (2006.01)

(56) References Cited

U.S. PATENT DOCUMENTS

| | | | |
|---|---|---|---|
| 8,073,984 | B2 | 12/2011 | Lydon et al. |
| 8,086,781 | B2 | 12/2011 | Ananny et al. |
| 8,204,435 | B2 * | 6/2012 | Seshadri et al. ............ 455/41.2 |
| 2004/0077382 | A1 * | 4/2004 | Verity ....................... 455/569.1 |
| 2005/0075133 | A1 * | 4/2005 | Pinder et al. ................. 455/557 |
| 2005/0248717 | A1 * | 11/2005 | Howell et al. .................. 351/41 |
| 2006/0019605 | A1 * | 1/2006 | Shau ............................ 455/66.1 |
| 2010/0151722 | A1 | 6/2010 | Beller et al. |
| 2012/0112930 | A1 * | 5/2012 | Ivanov et al. .................. 341/20 |

FOREIGN PATENT DOCUMENTS

| | | | |
|---|---|---|---|
| WO | WO 94/11802 | A1 | 5/1994 |
| WO | WO 99/18496 | A1 | 4/1999 |
| WO | 03/007149 | A2 | 1/2003 |
| WO | WO 03/007149 | A2 | 1/2003 |
| WO | 2011/128489 | A1 | 10/2011 |
| WO | PCT/FI2010/050294 | A1 | 10/2011 |

OTHER PUBLICATIONS

International Written Opinion corresponding to co-pending International Patent Application Serial No. PCT/EP2013/059072, European Patent Office, dated Nov. 29, 2013; (5 pages).
EPO Letter; Comments in relation to the submitted 3rd party submissions with enclosures A1-A5; Dated May 4, 2015 (28 pages).
Communication pursuant to Rule 114(2) EPC; European Patent Office; Dated Jan. 19, 2015; (1 page).
Third Party Observations against: Application No. 13722332.7; Nextlink IPR AV; Dated Jan. 9, 2015; (14 pages).
HearForever®; QUIETPRO—Norsk Rederiforbund; Honeywell; Dated no later than Jan. 9, 2015; (89 pages).
Electronic design; The Authority on Emerging Technologies for Design Solutions; Auto Merge; Dated Aug. 27, 2009; electronicdesign.com; (3 pages).

* cited by examiner

CABLE CHIP SYSTEM

CROSS-REFERENCE TO RELATED APPLICATIONS

This application is a U.S. National Stage of International Application No. PCT/EP2013/059072, filed May 1, 2013, which claims the benefit of Denmark Patent Application No. PA 2012 70224, filed May 2, 2012, both of which are incorporated herein by reference in their entireties.

FIELD OF THE INVENTION

The present invention relates to communications systems for which predefined common standards for connection, identification and communication between devices are not provided. In particular, the invention relates to a device-specific interface between devices in such system, which renders hot swapping and hot plugging of devices possible.

BACKGROUND OF THE INVENTION

In digital data communication between computers and electronic devices, the connection as well as the discovery of a new device in a system has become subject to a number of possible interface standards such as USB and FireWire specifying both the connector of the interface as well as the communications protocol to be used. These standards have led to extensive possibilities for hot swapping (replacing components without system interruption) and hot plugging (adding components to expand the system without system interruption).

For voice communication devices such as radios, intercoms, or phones, the interfacing with peripheral devices (here e.g. headsets or push-to-talk (PTT) devices) has been designed and produced specifically to one brand and type of device. This means that the user is "locked" in his one configuration for the life span of the equipment. If another radio or mobile phone is required, a new peripheral device is typically also needed. Hence, hot swapping, or indeed swapping at all, is not possible.

With the increasing computing power, new functions and requirements have been added to many voice communication devices which means that having just as standard connector (plug/socket) will not suffice, as many devices have different ways of interfacing (connection detection method, impedances, signal levels, control signals, etc.). Thus, a headset or a PTT device will have to be adapted to whatever radio system it is to be connected to, otherwise the system will not operate satisfactory and communication will not be clear and un-distorted.

INVISIO (www.invisio.dk) has provided a "hot swap cable" system utilizing the fact that a special cable is typically required between the PTT and the radio, since each radio has special interface connectors. The PTT can identify the cable and thereby the brand/type/model to which particular radio it is connected, and can adjust its settings to match the radios requirements. Even in this solution, the PTT can only match specifications of radios known beforehand.

Other technical fields where peripheral devices from a range of producers are to be connected and where no standard has yet been agreed upon face similar challenges.

Patent specification U.S. Pat. No. 8,086,781 discloses an intermediate device connecting to a host device, e.g. a media player, mobile phone, PDA, handheld computer, laptop computer, desktop computer, etc., and an accessory, e.g. a headset with earphone and microphone, stereo headphones, microphone, remote control, keyboard, mouse, etc.

The intermediate device function more or less like a docking station and e.g. converts commands from a 'host-side' command protocol into an 'accessory-side' command protocol or the other way around and thus translates between the different formats. It does not disclose that information relating to identification of and/or settings for the host device is stored in the intermediate device and does not disclose that such information is transmitted to the accessory to enable it to communicate with the host device.

The intermediate device connects with the host device and accessory using standardised connectors and procedure e.g. like USB or FireWire and is not a device-specific interface specific to a particular host device.

Hence, an improved way of connecting peripherals to components would be advantageous in fields where there are no standards for connection and communication, e.g. like there otherwise is for plug and play interfaces such as USB or FireWire. In particular, a way of connecting peripherals that allows automatic configuration of the peripheral to the component would be advantageous.

SUMMARY OF THE INVENTION

It is an object of the present invention to provide a device-specific interface between a first and a second device in a system such as a voice communication system, which renders hot swapping and hot plugging possible between devices not having a predefined standard for such or between devices which have not been prepared, adapted, or configured to be connected.

It is another object to provide a method for providing digital information to the first device allowing the first device to identify and/or adapt to the second device to render hot swapping or hot plugging possible.

It is yet another object to provide various usages of a device-specific interface between a first and a second device, which holds digital information relating to the second device.

Thus, the above described object and several other objects are intended to be obtained in a first aspect of the invention by providing a device-specific interface for interfacing a first device directly to a particular second device in a system, where the second device specifies particular settings to be used by the first device when exchanging data with the second device or alternatively where the second device sets requirements to electronic data to be exchanged with the second device, and where predefined standards for connection, identification or communication between devices are not provided, such as a voice communication system. The interface comprising:

first and second connectors for connecting the interface to the first and second devices, respectively;

an electronic data connection between the first connector and the second connector;

an integrated circuit comprising a memory holding digital information relating to identification of the particular second device and potentially also a particular configuration of the particular second device and/or relating to particular settings to be used when exchanging electronic data with the particular second device via the electronic data connection; and a digital data interface between the first connector and the integrated circuit enabling the first device to access the digital information.

In one embodiment, the digital information comprises settings specific to the particular second device to be used by the first device when exchanging electronic data signals with the second device and wherein the device-specific interface is adapted to provide the digital information comprising settings specific to the particular second device to the first device thereby enabling the first device to automatically adapt its settings and/or functionality according to the settings specific to the particular second device.

In a second aspect, the invention provides a first device for being connected to a second device in a voice communication system via the device-specific interface according to the first aspect, the first device comprising:

an interface connector for connecting with the first connector of the interface; and an integrated circuitry or electronic processor for retrieving the digital information in the memory of the interface via the digital data interface upon connection, upon request, or during use and for applying the retrieved digital information in determining how to communicate or exchange electronic data with the second device.

Here, how to communicate with the second device covers all aspects of rendering the communication possible or optimising it. Embodiments may be a specific communication protocol or settings to be applied in the communication, physical or electrical adjustment of signal properties (such as impedance or encoding scheme, carrier frequency), as well as adjustments of the electrical setup in the first device (e.g. switching the use of the various pins in the interface connector).

In a third aspect, the invention provides a device assembly comprising a device-specific interface according to the first aspect and a first device according to the second aspect to be connected to the interface via the first connector and the interface connector.

In a fourth aspect, the invention provides a method for providing, to a first device in a system where predefined standards for connection, identification and communication between devices are not provided, such as a voice communications system, digital information relating to a particular second device to be connected to the first device via a device-specific interface, the method comprising:

providing a device-specific interface comprising:

first and second connectors for connecting the interface to the first and second devices, respectively;

an electronic data connection between the first connector and the second connector;

an integrated circuit comprising a memory holding digital information relating to identification of the particular second device and/or relating to particular settings to be used when exchanging electronic data with the particular second device via the electronic data connection; and a digital data interface between the first connector and the integrated circuit enabling the first device to access the digital information;

connecting the first device to the interface via the first connector; and providing the digital information to the first device and applying settings in the first device corresponding to particular settings to be used when exchanging electronic data with the second device.

In further aspects, the invention relates to various use of such device-specific interface holding digital information allowing a first device to identify or adapt to a particular second device when the first and second devices are connected via the interface in a system where predefined standards for connection, identification and communication between devices are not provided, such as a voice communication system.

In the following, a number of further aspects, preferred and/or optional features, elements, examples and implementations will be described. Features or elements described in relation to one embodiment or aspect may be combined with or applied to the other embodiments or aspects where applicable. For example, structural and functional features applied in relation to the device-specific interface may also be used as features in relation to the other aspects and vice versa. Also, explanations of underlying mechanisms of the invention as realized by the inventor are presented for explanatory purposes, and should not be used in ex post facto analysis for deducing the invention.

The invention is preferably limited to devices in systems for which predefined industry standards (such as IEC standards) for connection, identification and communication between devices are not provided.

In the present description, the interface provides a connection or channel for transmission of electronic data, such as analogous or digital electronic signals, between the first and second devices. In this respect, the electronic data connection of the interface may be a wire or cable between the first connector and the second connector or may involve a wireless connection between the first connector and the second connector. In either case, the integrated circuit and the memory are embedded in the cable or in the first or second connector so that they are physically part of the interface. The first and second connectors may be plugs, jacks, or other physical connectors for connecting the interface to the devices. Alternatively, if a device has an integrated wireless communication possibility, such as Wi-Fi, Bluetooth or similar, the connector for that device may be a corresponding transceiver comprised by the interface.

That the interface is "device-specific" means that it is specific to the particular second device in that the digital information relates specifically to the identity of, or to settings required or specified by, the second device. The interface is to be used only with the particular second device to which it is specific, and will be produced and sold for this use. Hence, when changing the particular second device, the interface is also to be changed to an interface specific to the new particular second device. Thus, the interface follows the particular second device to which it is specific. In case of wireless interfaces, only the second connector need be replaced and the IC is preferably integrated in this part.

Where the digital information solely identifies the particular second device, the first device needs to access the settings required by the particular second device elsewhere. In these cases, the settings corresponding to a number of possible particular second devices could be embedded in the software of the first device, or the first device could access those settings externally such as in a database via a network connection or in the second device itself via the digital data communication link between the first and second devices as described later. Upon identifying the relevant second device via the interface, the first device may then retrieve and apply the corresponding settings. This is advantageous over the "hot swap cable" of the prior art in that the number of different devices and configurations are no longer restricted by the precision of the resistance measurement but by the memory size of the integrated circuit, which give basically no limit. It is also important to realize that the first device may be interfaced to many different second devices simultaneously using different device-specific interfaces in accordance with the invention. The different second devices may thereby be interfaced with each other via the first device and their respective device-specific interfaces. An example, which will be described later, is a an audio control box used as a central unit to simultaneously interface with and control more different radios, different headsets and further accessories such as PTT devices.

The digital information may then also identify a specific configuration of the particular second device, relevant to the extent that such specific configuration affects the settings to be used when exchanging electronic data with the particular second device. Such specific configuration may e.g. be the net that a dual net radio can use, or limitations to which functionalities in a second device that can be used depending on what a user (buyer of the cable) has paid for and/or has indicated a wish for. This may for example influence the number of I/O or PTT lines that need to be activated.

In an alternative embodiment, the digital information can relate to the particular settings to be used when exchanging electronic data with the particular second device. Hence, the settings themselves can be stored in the memory of the interface (as it is device-specific for the particular second device) and can be uploaded to the first device upon connection or request. Since the settings required by the particular second device are automatically provided to the first device by the interface, the first device does not need to know or learn anything about the identity of the particular second device, i.e. this information is redundant. However, the first device may also receive information about the identity, i.e. brand, model, type, and this may then be practical in relation to updates or if the interface is changed. From the above it is also to be understood that in cases where several different particular second devices requires or accepts the same settings, the same interface may be used to connect to these different devices. Hence, information about the precise identity of the particular second device may even have little meaning.

In a preferred embodiment, the digital information comprises settings specific to the particular second device and/or configuration to be used by the first device when exchanging electronic data signals with the second device, so that the settings follow the interface and not the first or second devices. This is advantageous since updated or changed settings can be implemented simply by replacing the device-specific interface so that there is no need to access the first device. Since the settings for a given device is embedded in the cable, adding new compatible devices will not require a software update for the first device, but will come "automatically" by purchasing and applying the right interface.

In a further aspect, the invention relates to the use of a device-specific interface for providing settings specific to a particular second device in a communication system to a first device to be connected to the particular second device via the interface, the settings being required by the first device when exchanging electronic data signals with the particular second device.

Since a lot of information about the capabilities of the particular second device may be stored in the memory of the interface, the first device may act differently depending on which particular second device is connected. Thus, in an additional embodiment, the digital information identifies features, such as functionalities, capabilities, etc., than can be enabled in the first device and/or in the second device. This is advantageous since information about the capabilities earlier had to be programmed into the software of the first device and was thus not easily changeable in already sold units. The features identified by the digital information may even be determined by features accessible only in a particular configuration of the second device; by features that a user has purchased access to; or by features that the user wants to have enabled. Examples of features—for this and other mentioned embodiments—may be very simple (although still important for a given user), e.g. like the form and/or duration of an acknowledgement tone or beep, to more advanced features like the activation of signal processing, noise reduction, etc.

It is an advantage that the functionality or features of the first and second devices may be controlled by the interface and thereby altered simply by providing a new interface. Thereby, each customer can have different settings or functionality based on the information within the interface, whereby several versions of the first device are not required.

Also, one customer having purchased a first device can change or select different functionality for the same particular second device, just by utilizing different interfaces, since his demands may change depending on mission type or user responsibility.

In a further aspect, the invention relates to the use of a device-specific interface for identifying such features (such as functionalities, capabilities, etc.) to a first device than can be enabled in the first device and/or in a particular second device to be connected to the first device via the interface. In a preferred embodiment of this use, the features identified by the digital information are determined by features that are accessible only in the particular configuration; by features that a user has purchased access to; and by features that the user wants to have enabled.

The information may additionally be used to provide control software of the first device. Thus, in a preferred embodiment, the digital information comprises control software, such as blocks or a full image of the control software, for the first device to be installed in or executed by the first device upon connection. This is advantageous since software blocks, complete algorithms, and functions may be stored in the memory of the interface and uploaded to the first device upon connection or upon request. This way the cable may define the functionality of the first device. Ultimately, the digital information may contain the full control software image to be uploaded and run by the first device when connected. In this way, a software upgrade of the first device may be done depending on which interface is connected.

In a further aspect, the invention relates to the use of a device-specific interface for supplying, supplementing, or updating control software for a first device, wherein the control software is held in the memory of the interface.

The various aspects of the invention preferably relates to voice communications systems incorporating a push-to-talk (PTT) device or a control box controlling the interfacing between different communication devices (i.e. having interface functionality), hereafter also referred to as simply a control box. Such voice communication systems, in accordance with an embodiment of the invention, involve interface cables to connect the PTT or control box to a headset and/or a communication device such as one or more of a man worn two-way radio, vehicle intercom system, mobile phone, etc. Thus, in a preferred embodiment, the interface is a communication device interface and the first device is a PTT device or an intelligent control box providing interface functionality. In this relation, the invention is advantageous as it allows such PTT devices or control boxes to be used with devices that are not specifically adapted for their functionality or that are not adapted to be interfaced with such devices. Also, in a preferred embodiment, the second device is a voice communication device such as a radio, a telephone, an intercom unit or similar, to which the first device is a peripheral device. Alternatively, the second device may be a peripheral device to the first device, such as a headset unit to be attached to a first device being a communication device, a PTT device, or a control box with interface functionality. These embodiments are advantageous in that they allow for a user to seamlessly use same control box for different headsets and/or different radios and/or other accessories such as remote PTTs or other, i.e. hot-swapping.

In one embodiment, it is preferred that the electronic data is digital or analogue audio or sound signals and that the electronic data connection of the interface selected to be suitable for this purpose. In the above embodiment relating to a PTT device or a control box with interface functionality and a communication device, the settings particular to the second device may relate to amplification of Rx and Tx signals, Full/half duplex capability of the second device which will change setup in the first device, number of radio-nets/PTT lines active, Open microphone or PTT, VOX capability, impedance levels, accessory detection methods, and many more.

In another embodiment, it is preferred that the electronic data is digital data such as digital audio data and that the electronic data connection is a digital data connection. In such embodiment, the digital information preferably specify the applicable communication protocol (typically a digital audio protocol) or features/functions to be activated.

It is preferred that the interface comprises a microprocessor or even a digital signal processor to allow the interface to provide even more advanced functionalities. Hence, in a preferred embodiment, the integrated circuit is an electronic processing unit.

It is generally preferred that the electronic data connection of the interface directly transmits electronic signals between the first and second devices without interruption. But, having a microprocessor or digital signal processor in the interface makes it possible to interact with the signals in the electronic data connection. Thus, in a further embodiment, the electronic processing unit may be connected to access and process data transmitted in the electronic data connection between the first connector and the second connector. Thereby, the interface not only transmits electronic data signals between the devices, but may also react upon the signals and even interfere with the signals and change these.

Having a microprocessor in the interface will also make it possible to interact with the serial communication- and/or control lines that are often present in the connectors to second devices such as radios. Thus, in another further embodiment, the interface further comprises a digital data interface between the second connector and the electronic processing unit. Hereby digital data communication between the interface and the second device can be made possible. With the already existing digital interface between the integrated circuit and the first device, digital data communication between the first and second devices via the interface can be made possible in addition to and parallel to the electronic data connection. Such additional digital link is typically only relevant when the electronic data connection of the interface is an analogue connection. In an alternative further embodiment, the interface further comprises a digital data interface between the first connector and the second connector for establishing a digital communication link between the first and second devices, preferably via the integrated circuit in the interface. This is advantageous since the immunity to interference will increase due to digital communication and since it provides the possibility of exchange of digital data between the first and second devices. Potentially, the second device could itself provide information relating to its applicable settings or requirements.

In a further aspect, the invention relates to the use of a device-specific interface with an electronic processing unit for:

accessing and processing data transmitted in the electronic data connection between the first connector and the second connector, wherein the electronic processing unit is connected to the electronic data connection; and/or providing digital data exchange between a first device and a particular second device, where the first and second devices have not been prepared, adapted, or configured to be connected or for which devices no common standards for connection, identification and communication between devices are provided, wherein the second connector provides a digital data interface between the second device and the electronic processing unit.

The basic idea of the invention is to use an interface between a first and a second device in a voice communication system, which interface is specific to the second device and holds digital information allowing the first device to identify or adapt to the second device. This allows the first device to automatically adapt its settings and/or functionality to, and thus to function with, several different second devices without any need for updating, re-configuration, or user intervention. Thus the first device can be hot swapped or hot plugged with different second devices simply by using a cable specific to each particular second device.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

DETAILED DESCRIPTION OF THE INVENTION

Figure 1:
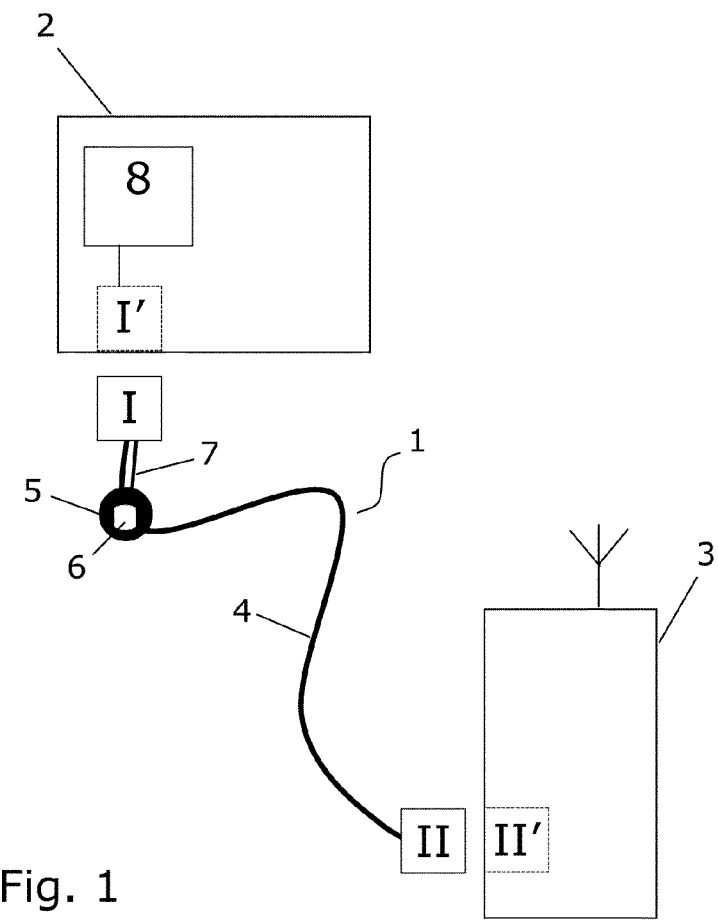
FIG. 1 is a schematic illustration of a device-specific interface and first and second devices according to an embodiment of the invention.

FIG. 1 illustrates a device-specific interface 1 according to an embodiment of the invention, for connecting a first device 2 and a particular second device 3, such as devices in a voice communications system.

The interface comprises first and second connectors I and II for connecting the interface to the first and second devices, respectively. The devices have corresponding interface connectors I' and II' for connecting with the connectors of the interface. An electronic data connection between the first connector and the second connector is provided, here in the form of a cable 4, but it could also be a wireless connection as described elsewhere. The interface further comprises an integrated circuit 5 comprising a memory 6 (hereafter commonly referred to as the IC), which is connected to the first connector via a digital data interface 7 allowing the first device to access digital information held by the memory when connected. It is to be noted that the electronic data connection between the devices, here cable 4, may be via or circumventing the IC 5.

FIG. 1 further illustrates the first device 2 according to another embodiment of the invention, for being connected to the particular second device 3 via the device-specific interface 1. The first device comprises an interface connector I' for connecting with the first connector I of the interface, and an electronic processor 8 for retrieving the digital information in the memory of the interface via the digital data interface 7.

Figure 2:
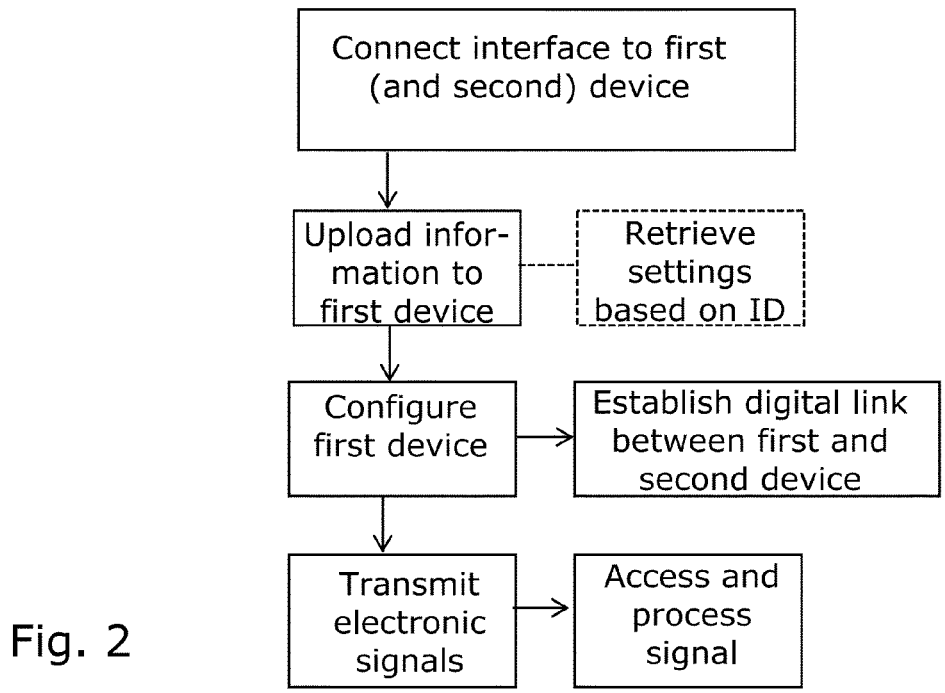
FIG. 2 is a flow chart embodying a method according to an embodiment of the invention, as well as illustrating the use of the interface and devices.

FIG. 2 is a flow chart used to illustrate a method for providing digital information relating to the particular second device 3 to the first device 2 via the device-specific interface 1 according to another embodiment of the invention, as well as the use of the interface 1 and device 2. The invention mainly applies to systems where the second device specifies or requires particular settings to be used by the first device when transmitting electronic data to the second device, and where no predefined industry standard for those settings is used. The memory of the interface holds digital information relating to the identity of the particular second device and/or relating to the particular settings.

Firstly, the interface 1 is connected to at least the first device 2, and the digital information in the memory of the interface is uploaded to the electronic processor 8 of the first device. If the digital information only comprises an identification of the particular second device 3, the applicable settings have to be retrieved, could be in memory or software of first device or elsewhere. The digital information may also include the settings.

The settings are applied by the first device to configure it to communicate with the second device. Most often, the particular second device will also be connected, so that signals can be transmitted between the devices via the electronic data connection of the interface.

The invention then offers a number of possible further options. For example, the integrated circuit 5 of the interface may be an electronic processing unit which can access and process the transmitted signals, e.g. for the purpose of amplification, filtration or measurement. Alternatively, a digital communication link between the first and second devices can be established in parallel to the electronic data connection.

Figure 3:
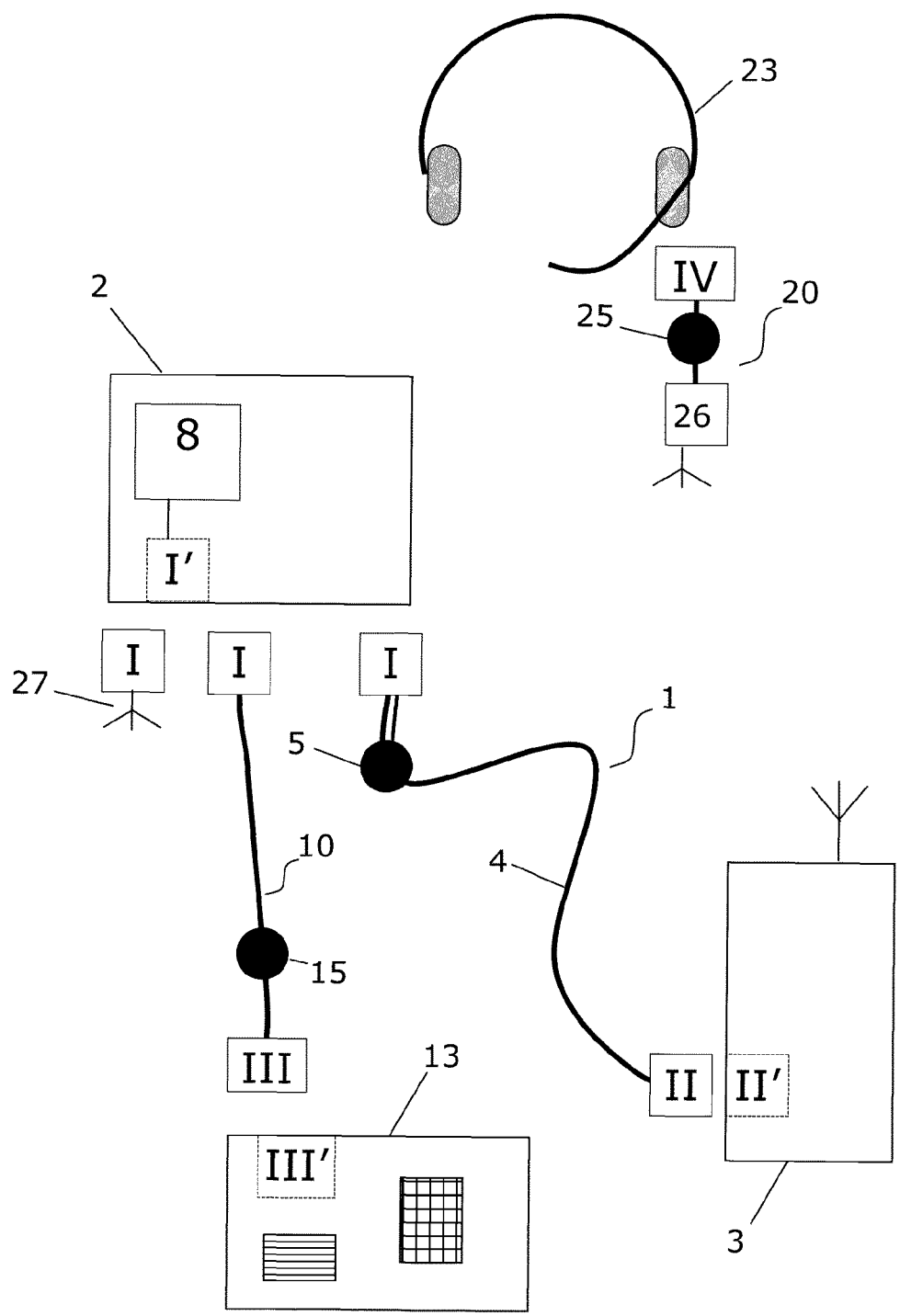
FIG. 3 is a schematic illustration of a device-specific interface with a first device and various particular second devices according to embodiments of the invention.

FIG. 3 is a schematic illustration of various further embodiments of the invention. Here, a number of different particular second devices 3, 13, 23 are connected to a first device, here a PTT device via device-specific interfaces 1, 10, 20, respectively. In a practical example, the PTT device could be an INVISIO M30 PTT.

In a preferred embodiment, the particular second device is a particular single duplex radio 3, meaning a particular brand and a particular type and series. In a practical example, the radio could be a Motorola GP340, Selex PRR. The radio 3 is connected to the PTT device via the interface 1. The interface 1 is specific to the radio 3 in that the IC 5 of the interface holds information which uniquely identifies the radio (e.g. brand, serial nr., type nr.) or settings required or preferred by the particular radio.

In another embodiment, the particular second device is an intercom device 13, meaning a particular brand and a particular type and series. The intercom device 13 is connected to the PTT device via the interface 10. The interface 10 is specific to the intercom device 13 in that the IC 15 of the interface holds information which uniquely identifies the intercom device (e.g. brand, serial nr., type nr.) or settings required or preferred by the intercom device.

Now, the if the user of the PTT device are to move from an open environment into a contained environment, such as from the ground into an airplane or helicopter or from the water into a ship or submarine, it may be necessary to switch between communication devices used in the different environments. In open environments wireless RF radios are commonly used, whereas wired intercoms are often preferred in contained environments to improve security and avoid interference with other systems. Since the radio 3 and the intercom 13 may have very different requirements to signal amplification, coding, interrupt signals etc., the configuration of or settings applied by the PTT must be changed when swapping from the radio to the intercom device.

With the present invention, this change is easily implemented simply by also switching the cable to use the interface 13 specific to the intercom. As explained above in relation for FIG. 2, this allows particular settings specific to the intercom device to be applied by the PTT device without any user intervention.

In another embodiment, the second device may be a peripheral to the first device. An example of such embodiment is also illustrated in FIG. 3, where a headset 23 with speakers and microphone is a particular second device connected to the PTT device 2 via a device-specific interface 20. The interface 20 is specific to the headset 23 in that the IC 25 of the interface holds information which uniquely identifies the headset (e.g. brand, serial nr., type nr.) or settings required or preferred by the headset, such as settings for signals turning the microphone on/off.

Yet another embodiment is illustrated in this relation, namely that the electronic data connection of the interface can be wireless using transmitter devices 26 and 27 replacing the cable between the first and second connector in the interfaces described previously. Transmitters and protocols from e.g. prior art headsets, such as Bluetooth, can be used to implement the wireless interface.

Figure 4:
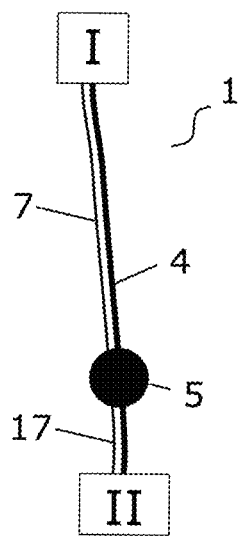
FIG. 4 is a schematic illustration of a device-specific interface according to an embodiment of the invention.

FIG. 4 illustrates the device-specific interface 1 described in relation to FIG. 1, further comprising a digital data interface 17 between the second connector and the IC 5. Hereby digital data communication between the interface and the second device can be made possible. With the already existing digital interface 7, a digital data communication link between the first and second devices via the IC 5 can be established in addition to and parallel to the electronic data connection 4. In another embodiment, this link can be established to circumvent the IC 5.

A very wide range of applications of the interface according to the invention is foreseen.

In one scenario, the interface can be used to connect a given first device to almost any type of second device for which no predefined common standards for connection, identification and communication have been provided to the first device. In this scenario, the second device could for example be almost all kinds of radios with various functions, intercoms, mobile phones, external PTT devices, headsets (circumaural headsets, submersible single sided headsets, dual sided headsets with and without hearing protection), programming devices, computers, video recorders or cameras, etc.

In another, more specific scenario, the first device is a PTT device or an intelligent control box with interface functionality to be worn by a person, and the interface can be used to connect to almost any type of second device for providing added functionality. One application is a "medic-cable" which allows a doctor or medical aid worker to connect his communication device to the communication device of a wounded person (e.g. a soldier) to provide a direct communication link (i.e. independent of the respective communications systems) and thus allow talking to the wounded person also in very noisy conditions. Another application is to connect the PTT device to a still or video camera worn by the person to provide additional "push to record" functionality which would simplify operation and save both battery and memory requirements and data transmission. Other applications can be provided by interfacing to battle-management systems, GPS devices, blast sensors, soldier monitoring sensors, etc.

In a preferred embodiment, the PTT device can be a device-hub for persons in extreme environments such as soldiers, police, rescue personnel, and other task forces. By providing an open interface capability by means of the invention, a very wide range of possibilities is made possible.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A device-specific interface for interfacing a first device directly to a particular second device in a voice communications system, where the device-specific interface is specific to the particular second device and the second device specifies particular settings to be used by the first device when exchanging data with the second device, the interface comprising:
    first and second connectors for connecting the interface to the first and second devices, respectively;
    an electronic data connection between the first connector and the second connector;
    an integrated circuit comprising a memory holding digital information relating to identification of the particular second device and/or relating to particular settings to be used when exchanging electronic data with the particular second device via the electronic data connection; and
    a digital data interface between the first connector and the integrated circuit enabling the first device to access the digital information,
wherein
    the digital information comprises settings specific to the particular second device to be used by the first device when exchanging electronic data signals with the second device and wherein the device-specific interface is adapted to provide the digital information comprising settings specific to the particular second device to the first device thereby enabling the first device to automatically adapt its settings and/or functionality according to the settings specific to the particular second device,
    the device-specific interface is a push-to-talk interface and the first device is a push-to-talk device,
    the electronic data connection of the device-specific interface is a wire or cable between the first connector and the second connector,
    the integrated circuit and the memory are embedded in the wire or cable or in the first or second connector so that they are physically part of the interface, and
    the voice communications system is a communications systems for which predefined common standards for connection, identification and/or communication between devices are not provided.

2. The device-specific interface according to claim 1, wherein the digital information identifies features than can be enabled in the first device and/or in the second device.

3. The device-specific interface according to claim 2, wherein the features identified by the digital information are determined by one or more of features that are accessible in a particular configuration; by features that a user has purchased access to; and by features that the user wants to have enabled.

4. The device-specific interface according to claim 1, wherein the digital information comprises control software for the first device to be installed in or executed by the first device upon connection.

5. The device-specific interface according to claim 1, wherein the integrated circuit is an electronic processing unit connected to access and process data transmitted in the electronic data connection between the first connector and the second connector.

6. The device-specific interface according to claim 1, wherein the integrated circuit is an electronic processing unit and wherein the interface further comprises a digital data interface between the second connector and the electronic processing unit.

7. A first device for being connected to a second device in a voice communication system via the device-specific interface according to claim 1, the first device comprising:
    an interface connector for connecting with the first connector of the interface; and
    an electronic processor for retrieving the digital information in the memory of the interface via the digital data interface and for applying the retrieved digital information in determining how to communicate with the second device.

8. A method for providing, to a first device in a voice communications system, digital information relating to a particular second device to be connected to the first device via a device-specific interface, the method comprising:
    providing a device-specific interface comprising:
        first and second connectors for connecting the interface to the first and second devices, respectively;
        an electronic data connection between the first connector and the second connector;
        an integrated circuit comprising a memory holding digital information relating to identification of the particular second device and/or relating to particular settings to be used when exchanging electronic data with the particular second device via the electronic data connection; and
        a digital data interface between the first connector and the integrated circuit enabling the first device to access the digital information;
    connecting the first device to the interface via the first connector; and
    providing the digital information to the first device and applying settings in the first device corresponding to particular settings to be used when exchanging electronic data with the second device, wherein
        the device-specific interface is a push-to-talk interface and the first device is a push-to-talk device,
        the electronic data connection of the device-specific interface is a wire or cable between the first connector and the second connector,
        the integrated circuit and the memory are embedded in the wire or cable or in the first or second connector so that they are physically part of the interface, and
        the voice communications system is a communications systems for which predefined common standards for connection, identification and/or communication between devices are not provided.

9. The method according to claim 8, wherein the digital information identifies features than can be enabled in the first device and/or in the second device.

10. The method according to claim 9, wherein the features identified by the digital information are determined by one or more of features that are accessible in a particular configuration; by features that a user has purchased access to; and by features that the user wants to have enabled.

11. The method according to claim 8, wherein the digital information comprises control software for the first device to be installed in or executed by the first device upon connection.

12. The method according to claim 8, wherein the integrated circuit is an electronic processing unit accessing and processing data transmitted in the electronic data connection between the first connector and the second connector.

13. The method according to claim 8, wherein the integrated circuit is an electronic processing unit and wherein the interface further comprises a digital data interface between the second connector and the electronic processing unit.

14. A device assembly comprising a device-specific interface according to claim 1 and a first device to be connected to the interface via the first connector and the interface connector, the first device comprising:
- an interface connector for connecting with the first connector of the interface; and
- an electronic processor for retrieving the digital information in the memory of the interface via the digital data interface and for applying the retrieved digital information in determining how to communicate with the second device.

15. Use of a device-specific interface according to claim 1 holding digital information allowing a first device to identify and/or adapt to a particular second device when the first and second devices are connected via the interface in a system, the first device comprising:
- an interface connector for connecting with the first connector of the interface; and
- an electronic processor for retrieving the digital information in the memory of the interface via the digital data interface and for applying the retrieved digital information in determining how to communicate with the second device.

16. A device-specific interface for interfacing a first device directly to a particular second device in a voice communications system, where the device-specific interface is specific to the particular second device and the second device specifies particular settings to be used by the first device when exchanging data with the second device, the interface comprising:
- first and second connectors for connecting the interface to the first and second devices, respectively;
- an electronic data connection between the first connector and the second connector;
- an integrated circuit comprising a memory holding digital information relating to identification of the particular second device and/or relating to particular settings to be used when exchanging electronic data with the particular second device via the electronic data connection; and
- a digital data interface between the first connector and the integrated circuit enabling the first device to access the digital information, wherein the voice communications system is a communications systems for which predefined common standards for connection, identification and/or communication between devices are not provided.

17. The device-specific interface according to claim 16, wherein:
- the device-specific interface is a push-to-talk interface and the first device is a push-to-talk device,
- the electronic data connection is a wire or cable between the first connector and the second connector, and
- the integrated circuit and the memory are embedded in the wire or cable or in the first or second connector so that they are physically part of the interface.

18. The method according to claim 8, wherein the integrated circuit and the memory are embedded in the wire or cable or in the first or second connector so that they are physically part of the device-specific interface.

* * * * *